(12) United States Patent
Ebert et al.

(10) Patent No.: US 6,683,474 B2
(45) Date of Patent: Jan. 27, 2004

(54) METHOD AND APPARATUS FOR COMMUNICATION USING A DISTRIBUTED MULTIPLEXED BUS

(75) Inventors: Jeffrey A. Ebert, Half Moon Bay, CA (US); Geert Rosseel, Menlo Park, CA (US); Michael J. Meyer, Palo Alto, CA (US)

(73) Assignee: Sonic, Inc., Mountain View, CA (US)

( * ) Notice: Subject to any disclaimer, the term of this patent is extended or adjusted under 35 U.S.C. 154(b) by 0 days.

(21) Appl. No.: 10/060,735

(22) Filed: Jan. 29, 2002

(65) Prior Publication Data

US 2003/0141904 A1 Jul. 31, 2003

(51) Int. Cl.$^7$ ........................................... H03K 19/0175
(52) U.S. Cl. ............................. 326/82; 326/47; 326/90; 326/86
(58) Field of Search ..................... 326/41, 47, 17, 326/82, 83, 86, 89, 90

(56) References Cited

U.S. PATENT DOCUMENTS

| | | | |
|---|---|---|---|
| 5,627,480 A | * 5/1997 | Young et al. | 326/17 |
| 5,847,580 A | 12/1998 | Bapat et al. | |
| 5,936,424 A | * 8/1999 | Young et al. | 326/39 |

\* cited by examiner

*Primary Examiner*—Anh Tran
(74) *Attorney, Agent, or Firm*—Blakely, Sokoloff, Taylor & Zafman LLP (57) ABSTRACT

An apparatus having a first and second bus is disclosed. In one embodiment, multiple units are coupled to the first and second buses. The units include a middle unit and two side units. Each side unit has a first bus output coupled to a first bus input of the middle unit. The middle unit has a second bus output coupled to a second bus input of each side unit.

18 Claims, 6 Drawing Sheets

METHOD AND APPARATUS FOR COMMUNICATION USING A DISTRIBUTED MULTIPLEXED BUS

FIELD OF INVENTION

The invention relates generally to a bus structure.

BACKGROUND OF THE INVENTION

Connecting a set of subsystems or logic blocks through a shared bus is a significant problem in designing integrated circuits. Conventional bus structures include a tri-state bus and a multiplexed bus.

A tri-state bus has a bus wire that is driven by one of several tri-state drivers, which, when enabled, actively drives the bus wire with the value of a data signal. All devices with a tri-state driver can receive the current from the bus wire.

However, this conventional approach has several disadvantages. Only one tri-state driver can be enabled at a time. If multiple drivers are simultaneously enabled, there can be significant leakage current which causes improper operation of the bus and may permanently damage the integrated circuit. If no driver is enabled, the voltage level of the bus will float. Unless additional circuitry is provided to prevent the floating voltage level, at least one driver must be enabled to drive the bus.

The difficulty of keeping one driver enabled while preventing multiple drivers from being enabled is a significant disadvantage of the tri-state approach. Furthermore, when the tri-state bus wire is long, the wire delay is adversely affected by the RC delay. Inserting repeaters into the tri-state bus wire is difficult, because the tri-state bus wire is bi-directional. This also adversely affects the performance of the bus.

Another conventional approach uses a multiplexed bus. The multiplexed bus has a large number of bus wires. Multiple drivers are attached to the multiple bus wires, so that every driver is connected to every other driver. Each driver performs a multiplex function to receive data from other drivers through several of the multiple bus wires.

This multiplexed approach has several disadvantages. The multiplexed approach is very expensive because of the large number of bus wires that are used. Also, the probability of routing congestion with the multiplexed bus is very high. Furthermore, inserting repeaters into the multiplexed bus is very complicated, unpredictable, and expensive, due to the large number of bus wires used. For example, as the number of devices attached to the bus increases, the number wires increases quadratically, and the number of repeaters increases as the number and length of wires increases.

SUMMARY

An apparatus having a first and second bus is disclosed. A plurality of units are coupled to the first and second buses. The units include a middle unit and at least two side units. Each side unit has a first bus output coupled to a first bus input of the middle unit. The middle unit has a second bus output coupled to a second bus input of each side unit.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 1:
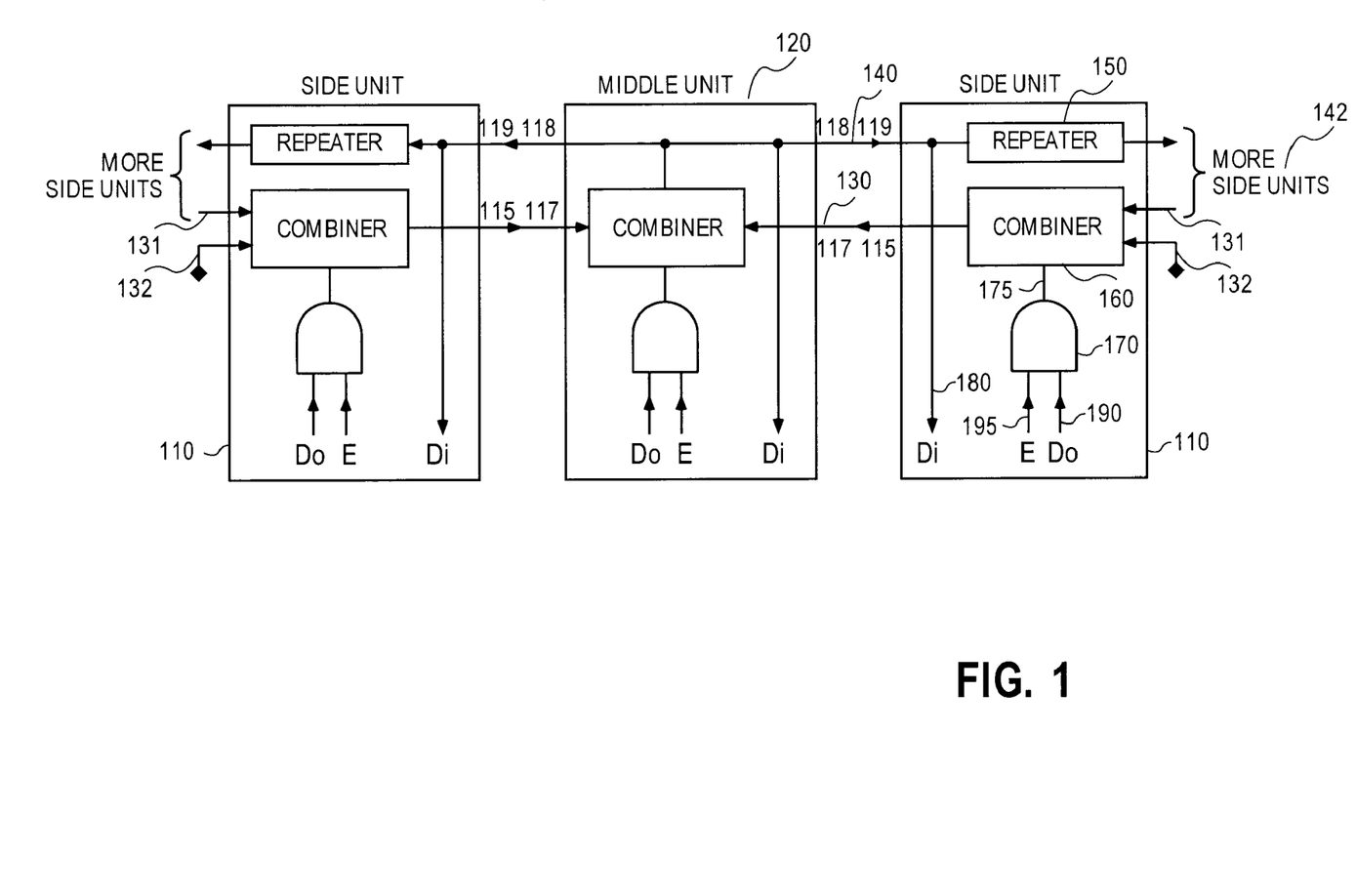
FIG. 1 shows an embodiment of a bus.

One embodiment of a bus interconnect structure 100, which includes a first bus, a second bus, and multiple units coupled to the first and second buses, is shown in FIG. 1. The units include a middle unit 120, a first side unit 110, and a second side unit 110. Bus 130 transmits data from a first device to the middle unit 120 through a side unit 110. Bus 140 transmits data from the middle unit 120 to a second device through a side unit. Each side unit 110 has a bus output 115 coupled to a bus input 117 of the middle unit 120. The middle unit 120 has a second bus output 118 coupled to a second bus input 119 of each side unit. In one embodiment, busses 130, 140 are considered individual busses. In alternate embodiments, separate busses are used to connect to each link as group of units. In one embodiment, the data transmissions are unidirectional, wherein separate paths are used. Alternately, bidirectional paths may be used.

In the embodiment, as shown in FIG. 1, side units 110 are simple side units that pass data linearly through the unit 110. In alternate embodiments, one or more of the side units may be embodied as merging side units which combine data from at least two units and passes on the combined data.

Figure 2:
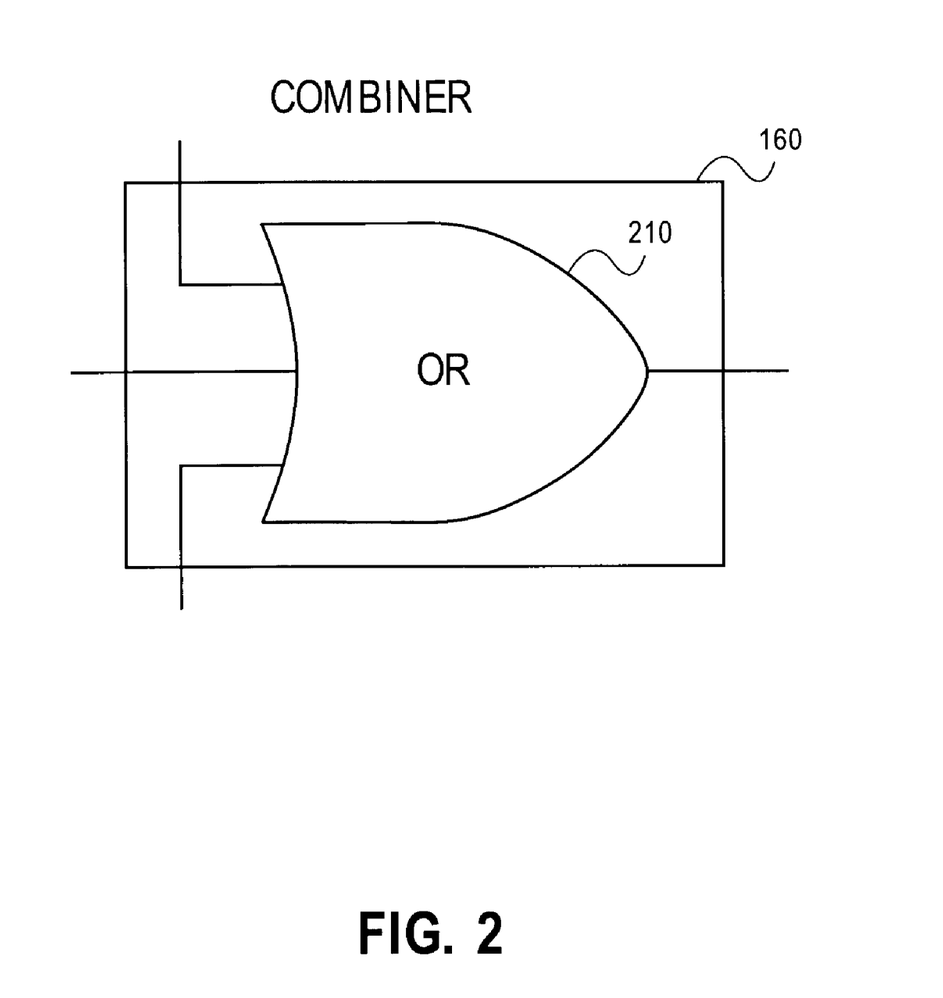
FIG. 2 shows an embodiment of a combiner.
Figure 3:
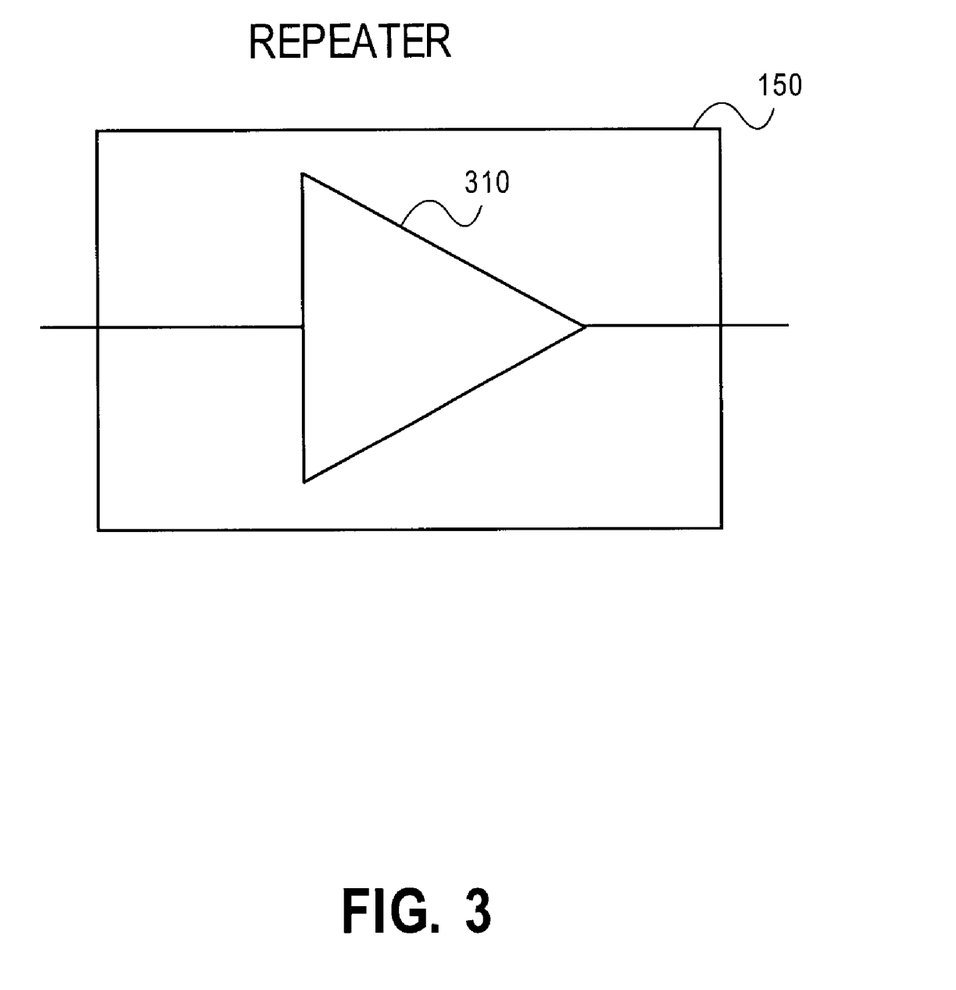
FIG. 3 shows an embodiment of a repeater.

The middle unit 120 has a combiner 160 coupled to the first bus inputs 117 and the second bus outputs 118 of the middle unit 120. Side unit 110 has a combiner 160 coupled to the first bus output 115 of the first side unit 110. The combiner may be an OR gate 210 as shown in FIG. 2, if positive logic signalling is used. Side unit 110 has a repeater 150 coupled to the second bus input 119 of the first side unit 110. The repeater 150 may be an amplifier, or buffer, 310 as shown in FIG. 3. Alternatively, repeater 150 may be an inverter, or a plurality of inverters, or no repeater may be used.

Unit inputs 190 are coupled to corresponding data outputs of devices that need to transfer or receive data from other devices. The combiner 160 is coupled to the unit input 190 and the first bus 130. A unit output 180 is coupled to the second bus 140 and a data input of a device. The device may be processor, a memory, an input/output device, a controller, or any other device that needs to exchange data with another device.

One or more side units 142 may be attached to one or both of the side units 110 shown in FIG. 1. For example, a third side unit having a first bus output coupled to a first bus input of the first side unit and a second bus input coupled to a second bus output of the first side unit may be attached to first side unit 110 using combiner input 132 or 131. Any unconnected combiner inputs 132 or 131 would be tied to 0.

When a unit 110 is ready to drive the bus structure 100, it asserts its enable signal E, 195, activating the unit input path 190, through the AND gate 170. For the other units 110, 120, the enable E 195 is de-asserted so a logic 0 will be driven into the combiner 160 from the AND gate 170 for the given unit. The enabled unit may drive either 0 or 1 into its combiner, depending on the desired value on its input 190. The selected logic value will propagate from the side units 110 through bus wire 130 towards the middle unit 120. In the middle unit 120, the logic value is driven back through bus wire 140 to each side unit 110 via repeaters 150. In this way, each unit 110, 120 may communicate a logic value to all other units. In normal operation, only one device drives a 1 on its E signal in each transmission period.

In another embodiment, more inverters and/or buffers in addition to repeater 150 may be added at the outputs of the units to improve the driving capability. Optimal buffer size must be selected dependent on wire-length and required performance.

Figure 4:
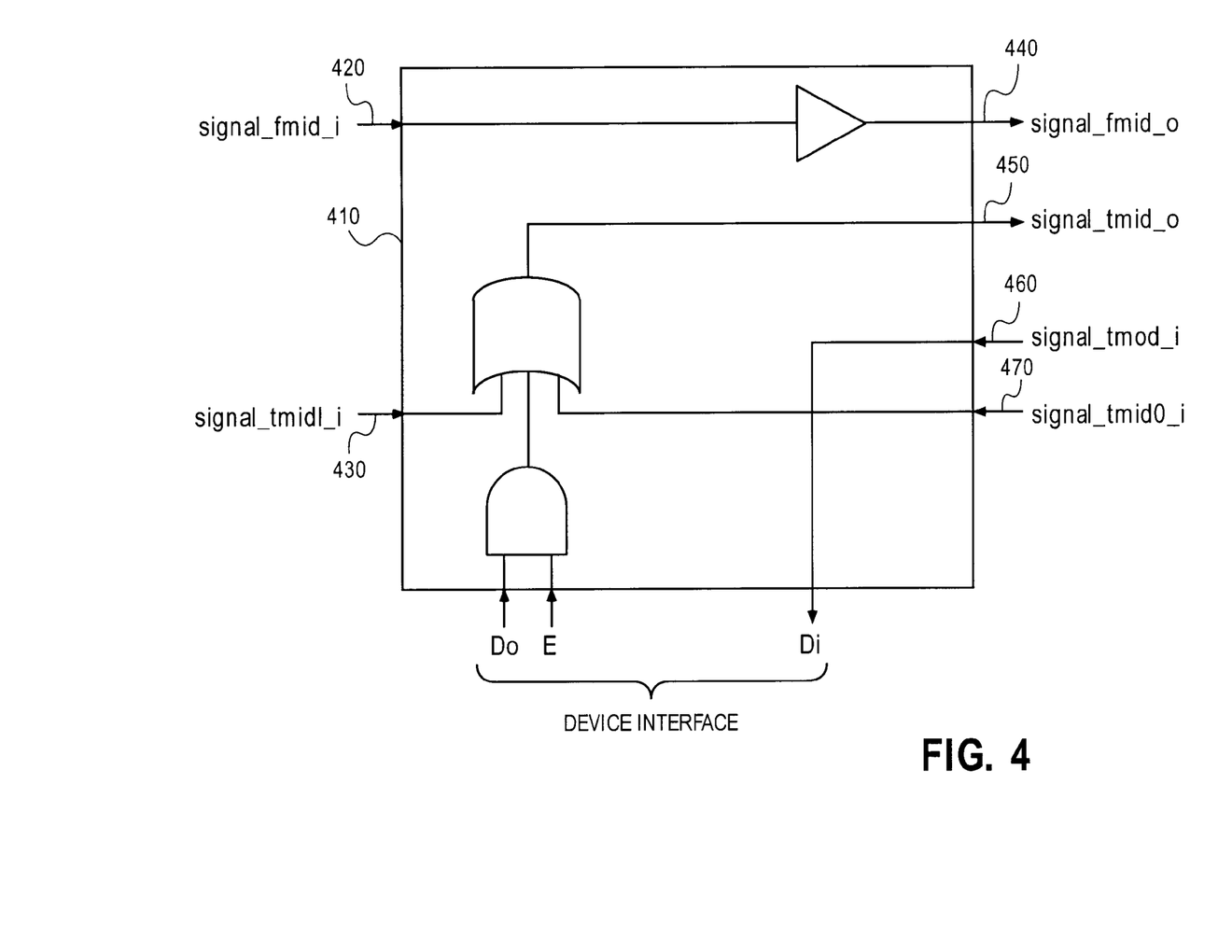
FIG. 4 shows an embodiment of a unified interconnect circuit.

A unified circuit structure 410 that may be used in all units 110, 120 is shown in FIG. 4. As shown in FIG. 4, two bus wires connect each unit to its neighbor, one bus wire going to a middle unit and the other bus wire going away from the middle unit. Each unit includes a combiner circuit, which may be implemented as a 3-input OR gate, and a repeater circuit, which may be implemented as a single non-inverting buffer. The repeater circuit may be included in the middle unit and left unconnected.

In an alternative embodiment, a "logical dual" unified circuit structure similar to the one shown in FIG. 4 may be used. For example, in the embodiment of FIG. 4, between every two blocks, the two bus wires representing a signal are the OR function of all AND-ed output and enable signals of the blocks to the left and right of that location. A logically equivalent circuit, for example, where the wires from the sides to the middle are the AND function of all OR-ed output and enable signals of the blocks, may also be used. In the logically equivalent embodiment, the unit output signal (Di) and Do and E 180 must be inverted by the unit. This embodiment may be more efficient depending on the specific implementation technology.

The unified interconnect circuit 410 of FIG. 4 can perform the function of a middle unit, a merging side unit, or a simple side unit, depending on the manner in which the external wires are connected.

Figure 5:
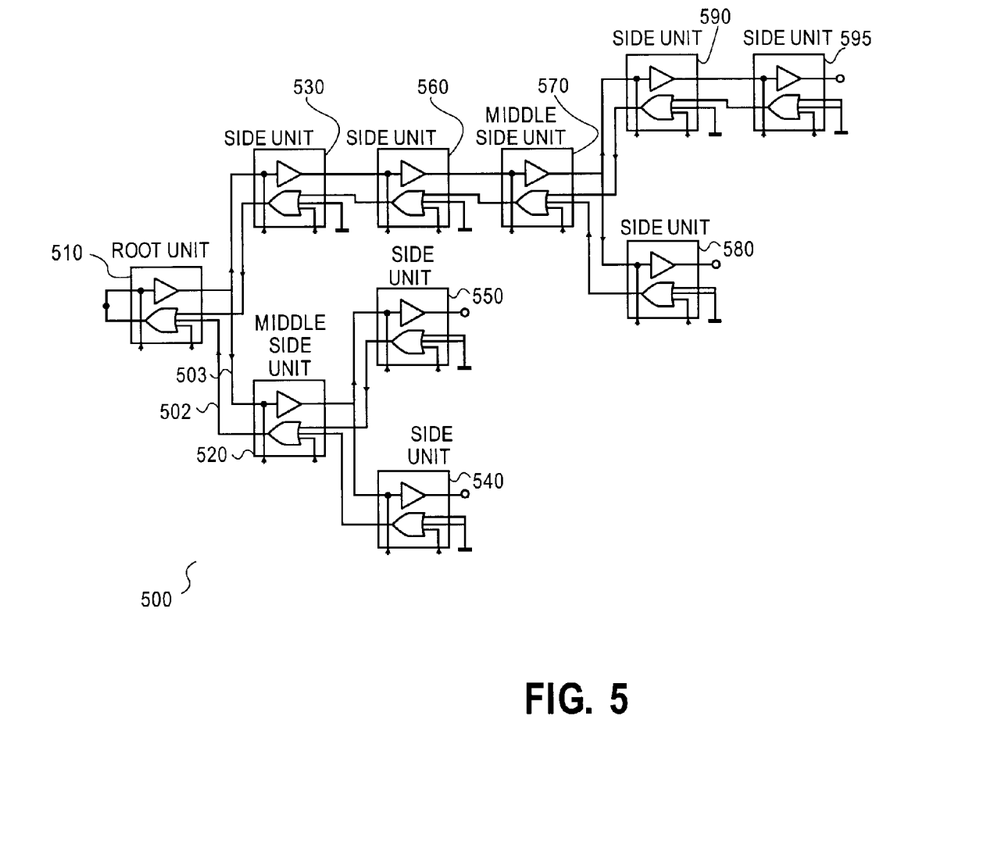
FIG. 5 shows an embodiment of a bus tree structure.

To implement a middle unit 120 (or 510), the first bus output 450 is connected to the second bus input 420 of the same unit. The input 460 that connects to the device input Di is also connected to the second bus input 420. The first bus inputs from side units 430 and 470 are connected to two different side units 110 via their first bus outputs 115, or if one or more is not used, it is connected to logic 0. The second bus output 440 is connected to both side units via their second bus inputs 119.

To implement a merging side unit 520, the second bus input 420 is connected to the second bus output of another side unit or a middle unit. The input 460 that connects to the device input Di is connected to the second bus input 420. The first bus inputs from side units 430 and 470 are connected to two different side units 110 via their first bus outputs 115, or if one or more is not used, it is connected to logic 0. The second bus output 440 is connected to both side units via their second bus inputs 119.

To implement a simple side unit 110 (or 530), the second bus input 420 is connected to the second bus output of another side unit or a middle unit. The input 460 that connects to the device input Di is connected to the second bus input 420. One first bus input 430 is connected to a side unit 110 via its first bus output 115, or if it is not used, it is connected to logic 0. The other first bus input 470 is always connected to logic 0 to implement the simple side unit. The second bus output 440 is connected to a side unit via its second bus input 119.

In another embodiment, the actual implementation in silicon technology of the circuit shown in FIG. 4 may utilize NAND-NOR gates rather than AND-OR gates. The OR in the combiner may be implemented as a NOR gate followed by an inverting buffer. Allowing the logic sense to alternate on each combiner or repeater traversal would lead to more efficient performance in many cases. To accommodate this capability, each unit would need to decide if its unit output signal, Di, should be inverted or not before being used within the unit.

By employing a unified interconnect circuit 410 to perform the combiner and repeater functions as shown in FIG. 4, it is easy to reconfigure the bus structure 100 of FIG. 1, including order changes and hierarchical changes, without modifying the internal logic or wiring of each unit 110,120. For example, multiple unified interconnect circuits 410 can be fabricated in an integrated circuit, and the connections for the bus structure can be created or changed. Furthermore, the unified interconnect circuit shown in FIG. 4 can be used to create a tree structure for the bus.

FIG. 5 shows an example of a bus tree structure 500. The tree structure 500 is logically equivalent to the linear bus 100 shown in FIG. 1. In this embodiment, several middle units may be used, allowing the bus to form branches like a tree. This approach is well suited to system designs employing subsystem units of widely varying size. For example, in one embodiment, unit 510 is one middle unit, having branch 520, which is a merging side unit, and branch 530, which is a simple side unit. Bus wire 502 transmits data from the branch units to the middle unit 510. Bus wire 503 transmits data from the middle unit 510 to the branch units 520,530. Merging side unit 520 has branches 540 and 550, which are both simple side units. Simple side unit 530 is connected to side unit 560, which in turn is connected to merging side unit 570. Merging side unit 570 has branches 580 and 590. The connections between units of the bus tree structure 500 may be reconfigured as needed. In addition, the fan-out of the tree structure can be increased from 2 (as shown) by adding additional inputs to the combiner 160.

Figure 6:
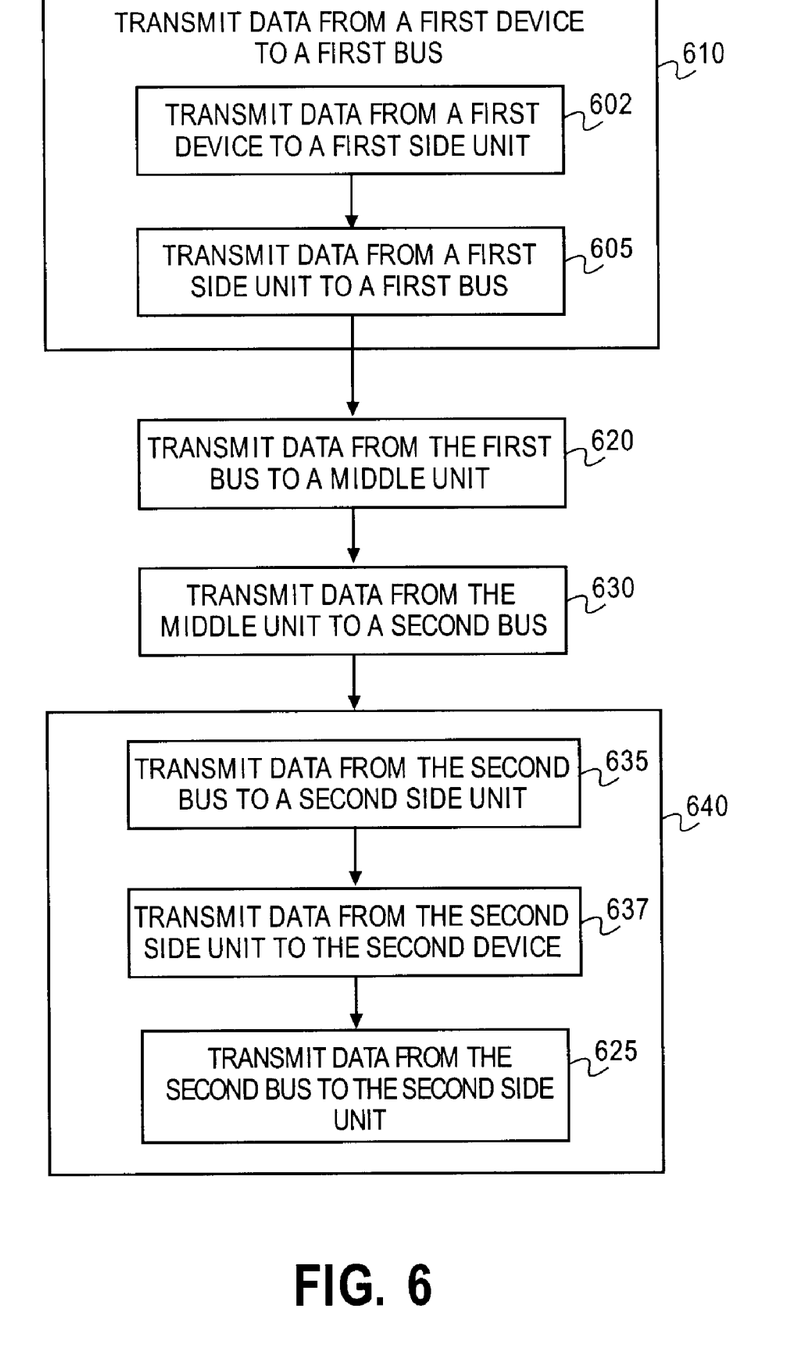
FIG. 6 shows an example of an embodiment of a method of transmitting data from one device to another device.

FIG. 6 shows an example of a method of transmitting data from one device to another device, so that the first bus 130 transmits data from a first device to the middle unit 120, and the second bus 140 transmits data from the middle unit 120 to a second device. Data is transmitted from a first device to the first bus, step 610. Data is transmitted from the first bus to the middle unit, step 620. Data is then transmitted from the middle unit to the second bus, step 630. Data is transmitted from the second bus to a second device, step 640.

The method may include transmitting data from a first device to a first side unit, step 602, then transmitting data from the first side unit to a first bus, step 605. The method may also include transmitting data from the middle unit to a second bus, step 630, transmitting data from the second bus to a second side unit, step 635, then transmitting data from the second side unit to the second device, step 637.

The method and apparatus of the present invention disclosed herein provide several advantages over prior art bus structures. The wire cost is significantly smaller than in the Multiplexed Bus solution, which increases exponentially with the number of subsystem units. The method and apparatus of the present invention has only twice the wire cost as the Tri-State Bus solution, which is the theoretical minimum for achieving any-to-any communication.

The method and apparatus of the present invention has built-in repeaters. In every unit, the bus wires are buffered, providing an inherent solution for the case when a long distance must be traversed.

There is no need for keepers or other logic when no block is enabled in the method and apparatus of the present invention. In this case, the data on all the bus wires is a logical 0.

When multiple enable-signals are high, there is no leakage current or danger of physically damaging the wires. Actually, when multiple enables are high, the input data in every block will be the OR function of the output data values of the blocks with active enable signals. While this behavior may not be functionally desirable in some cases, there is no risk of permanent damage to the circuit.

While the invention is described in terms of embodiments in a specific system environment, those of ordinary skill in the art will recognize that the invention can be practiced, with modification, in other and different hardware and software environments within the spirit and scope of the appended claims.

What is claimed is:

1. An apparatus comprising:
   a first bus;
   a second bus;
   a plurality of units coupled to the first and second buses,
      the units including a middle unit, a first side unit and a second side unit;
      each side unit having a first bus output coupled to a first bus input of the middle unit, said middle unit being the only unit capable of placing different logical values on said second bus;
      the middle unit having a second bus output coupled to a second bus input of each side unit, said second bus input of each side unit being logically equivalent, and a combiner coupled to the first bus inputs and the second bus outputs of the middle unit.

2. The apparatus of claim 1, wherein the combiner comprises an OR gate.

3. The apparatus of claim 1, wherein the first side unit is a merging side unit further comprising a combiner coupled to the first bus output of the first side unit.

4. The apparatus of claim 1, wherein the first side unit is a simple side unit which linearly passes data through the side unit.

5. The apparatus of claim 3, wherein the combiner comprises an OR gate.

6. The apparatus of claim 1 wherein the first side unit further comprises a unidirectional repeater coupled between the second bus input of the first side unit and the second bus output of the first side unit.

7. An apparatus comprising:
   a first bus;
   a second bus;
   a plurality of units coupled to the first and second buses,
      the units including a middle unit, a first side unit having an amplifier, and a second side unit;
      each side unit having a first bus output coupled to a first bus input of the middle unit;
      the middle unit having a second bus output coupled to a second bus input of each side unit and a combiner coupled to the first bus inputs and the second bus outputs of the middle unit; and
      the amplifier coupled between the second bus input of the first side unit and the second bus output of the first side unit.

8. The apparatus of claim 6, wherein the repeater and combiner are unified in one circuit such that the same circuit can be used for the middle and side units.

9. The apparatus of claim 1 wherein each unit further comprises a unit input coupled to a data output of a device.

10. An apparatus comprising:
    a first bus;
    a second bus;
    a plurality of units coupled to the first and second buses,
       the units including a middle unit, a first side unit and a second side unit, each unit having a unit input coupled to a data output of a device;
       each side unit having a first bus output coupled to a first bus input of the middle unit;
       the middle unit having a second bus output coupled to a second bus input of each side unit and a combiner coupled to the first bus inputs and the second bus outputs of the middle unit; and
       each unit having a combiner coupled to the unit input and the first bus, so that the unit input is coupled to the first bus by the combiner.

11. The apparatus of claim 1 wherein each unit further comprises a unit output coupled to the second bus and a data input of a device.

12. The apparatus of claim 11 wherein the device is selected from the group comprising a processor, a memory, an input/output device, and a controller.

13. An apparatus comprising:
    a first bus;
    a second bus;
    at least one side units coupled to the first or second buses,
       the units including a middle unit, a first side unit and a second side unit;
       each side unit having a first bus output coupled to a first bus input of the middle unit, said middle unit being the only unit capable of placing different logical values on said second bus;

the middle unit having a second bus output coupled to a second bus input of each side unit, said second bus input of each side unit being logically equivalent, and a combiner coupled to the first bus inputs and the second bus outputs of the middle unit;

where the side units may be merging side units.

14. The apparatus of claim 13, wherein said at least one side units is selected from the group consisting of a merging side unit and a simple side unit.

15. A method comprising:

transmitting data from a plurality of first side units to a first bus;

transmitting data from the first bus to a middle unit;

combining data received in the middle unit from the first bus to generate unidirectional data;

transmitting said unidirectional data from the middle unit to a second buss said middle unit being the only unit capable of changing logical values on said second bus; and transmitting said unidirectional data from the second bus to a plurality of second side units without going through an additional logical operation.

16. The method as set forth in claim 15, further comprising transmitting data from a first device.

17. The method as set forth in claim 15, wherein combining data combines data received from a specific first side unit and a specific second side unit.

18. The method as set forth in claim 17, wherein the specific second side unit is the same unit as the specific first side unit.

* * * * *

UNITED STATES PATENT AND TRADEMARK OFFICE
CERTIFICATE OF CORRECTION

PATENT NO. : 6,683,474 B2
DATED : January 27, 2004
INVENTOR(S) : Ebert et al.

It is certified that error appears in the above-identified patent and that said Letters Patent is hereby corrected as shown below:

<u>Title page,</u>
Item [73], Assignee, "Sonic, Inc.," should be -- Sonics, Inc. --.

<u>Column 8,</u>
Line 2, "buss", should read -- bus, --.

Signed and Sealed this

Twentieth Day of April, 2004

JON W. DUDAS
*Acting Director of the United States Patent and Trademark Office*